Jan. 8, 1952 S. C. KERSHAW 2,581,866
THREAD-ADVANCING REEL
Filed May 19, 1947 2 SHEETS—SHEET 1

INVENTOR.
Stanley C. Kershaw
BY Burgess, Ryan & Hicks
ATTORNEYS

Jan. 8, 1952  S. C. KERSHAW  2,581,866
THREAD-ADVANCING REEL
Filed May 19, 1947  2 SHEETS—SHEET 2
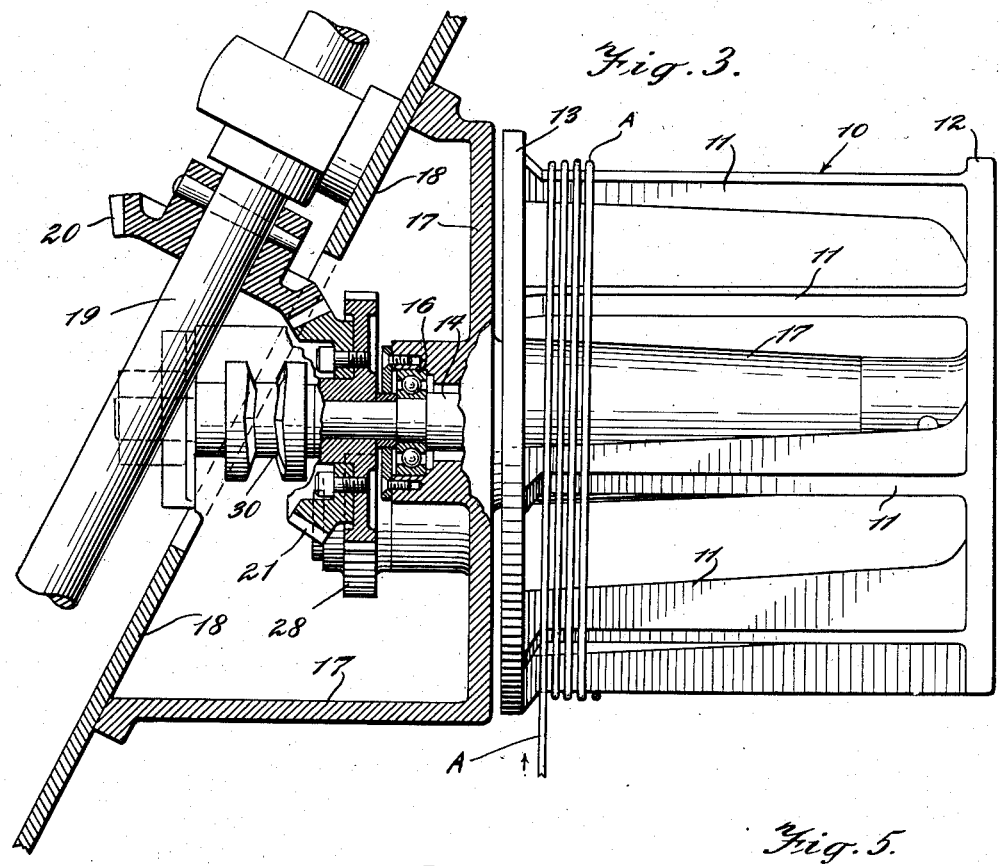
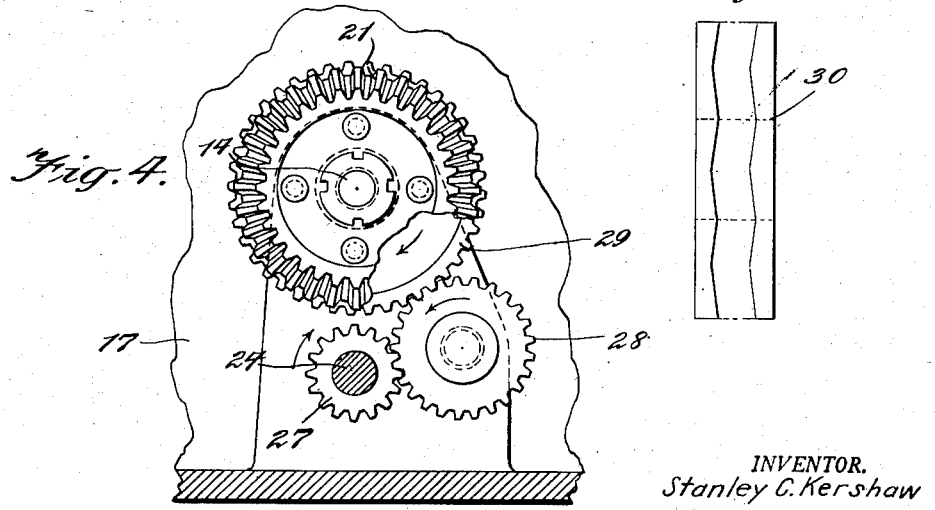
INVENTOR.
Stanley C. Kershaw
BY
Burgess, Ryan & Hicks
ATTORNEYS Patented Jan. 8, 1952

2,581,866

UNITED STATES PATENT OFFICE 2,581,866

THREAD-ADVANCING REEL

Stanley C. Kershaw, Saylesville, R. I., assignor to The Clark Thread Company, Inc., Newark, N. J., a corporation of Delaware Application May 19, 1947, Serial No. 748,890

6 Claims. (Cl. 28—71.7)

This invention relates to a thread-advancing reel and more particularly to a reel for automatically winding and advancing a thread thereon in a helical path.

The objects and advantages of the invention will be best understood from the following description and the accompanying drawings in which:

Fig. 3 is a plan view of the reel illustrated in Fig. 1 in section, approximately along the line 3—3;

Fig. 4 is an end view of the driving mechanism for the reel illustrated in Fig. 1; and Fig. 5 is a cam diagram on an exaggerated scale for a part of the reel illustrated in Fig. 1.

Figure 1:
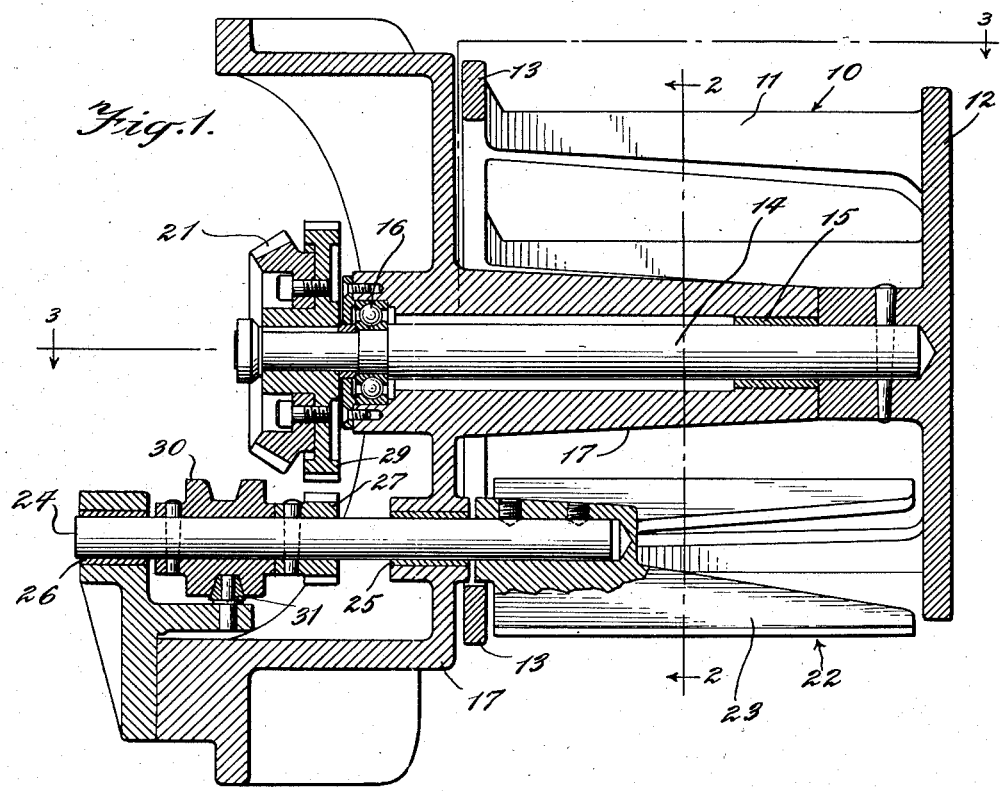
Fig. 1 is a side view in vertical section of a thread-advancing reel embodying the invention.

Referring to the drawings in detail, there is a main thread-supporting reel 10 on which a thread or filament A is wound in an approximately helical path, as shown in Figure 3, for storage and treatment thereon. The reel is shown in Fig. 3 with only a few turns of the thread A thereon. The reel is illustrated in this manner primarily for purposes of clarity, but this does represent the conditions that would exit at the time the reel is being initially loaded with thread. As the operation of the reel progresses, the thread will be automatically wound on the reel and will advance along the reel in a generally helical path until the reel is fully loaded with thread. When the thread is discharged from the reel, it may pass to a similar reel for further treatment or be wound on a spool or bobbin.

In the drawing, the thread is shown as being fed to the inner end of the reel, in which case it would be discharged from the outer end of the reel. However, in a reel of the construction to be described herein, the thread may be fed in either direction by reversing the direction of rotation of the reel. The thread is fed to and discharged from the reel in a continuous manner and is stored on the reel during its passage from one end to the other end. During the time that a given section of the thread is stored on the reel, the thread may be subjected to the usual finishing or other treatments as desired.

The reel 10 may be of the cantilever type as illustrated, but it should be understood that the features of the reel to be described are not limited in application to a reel of that type.

The main thread-supporting reel 10 has a series of thread-supporting arms 11 spaced about its periphery. The thread-supporting arms 11 are supported between a cap portion 12 at one end of the reel and an annular ring 13 at the other end of the reel. The thread-supporting arms 11 may be spaced widely enough apart so that effective treatment of the thread may be accomplished without special construction of the thread-supporting portions of the arms. The reel 10 is supported on and rotated by a shaft 14.

The shaft 14 is journalled in bearings 15 and 16 that are carried in a tubular extension of a base or supporting bracket 17. The base 17 may be secured to a machine frame 18 that may extend in angular relation to the reel so that a series of reels may be supported therefrom with the discharge end of one reel adjacent the thread-receiving end of the following reel. The machine frame 18 supports a main drive shaft 19 also angularly disposed. The drive shaft 19 carries a bevel gear 20 that engages with a bevel gear 21 secured to the shaft 14 supporting the thread-supporting reel 10.

Figure 2:
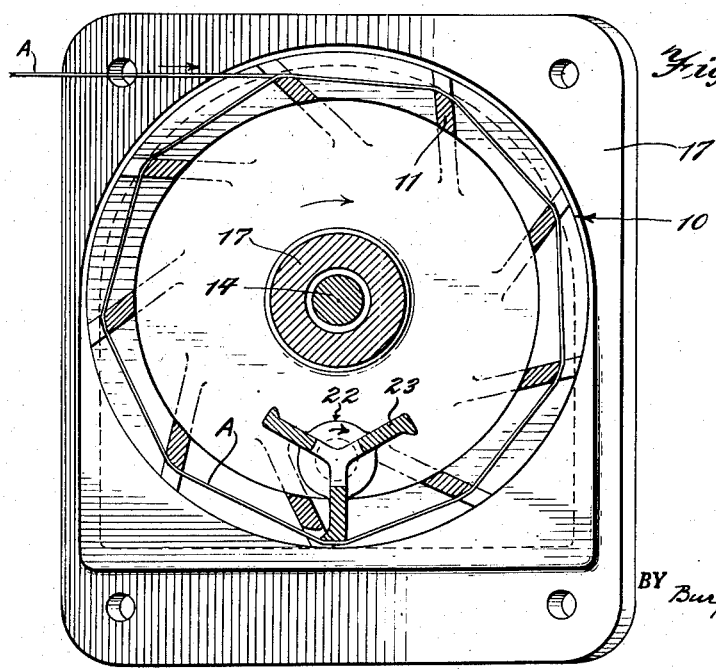
Fig. 2 is a section view taken approximately along the line 2—2 of Fig. 1.

A reciprocable reel 22 of a smaller diameter than the thread-supporting reel 10 is located within the thread-supporting reel 10. The inner reel 22 has a series of thread-engaging arms 23 that interdigitate successively between adjacent thread-supporting arms 11 of the main reel 10 as the reels are rotated. The arms 23 of the reel 22 periodically or for a portion of the time during which they are respectively interdigitated between the arms of the main reel, extend beyond the arms 11 of the main reel 10 and lift the thread A from the thread-supporting arm or arms 11 adjacent thereto as shown, for example, in Fig. 2. The reciprocable inner reel 22 is secured to a shaft 24 that is slidably journalled in bearings 25 and 26 in the base 17. The shaft 24 is spaced from but parallel with the shaft 14 for the main reel 10 and carries a gear 27. The gear 27 rotates the inner reel 22 in the same direction as the main reel 10 and to accomplish this, the gear 27 engages with an intermediate gear 28 that is driven by a gear 29 secured to the bevel gear 21 on the shaft 14 for the main reel 10.

The gears 27, 28 and 29 are arranged to rotate the inner reel 22 so that the thread-engaging arms 23 thereof will interdigitate successively between the thread-suporting arms 11 of the main reel 10 as the reels are rotated. In the reel illustrated, the main reel 10 has nine thread-supporting arms 11 and the inner reel 22 has three thread-engaging arms 23 so that the gearing is arranged to rotate the inner reel three revolutions for each revolution of the main reel. However, the number of arms on either reel may be varied and appropriate changes made in the gearing.

As the thread-engaging arms 23 of the inner reel interdigitate between the thread-supporting arms 11 of the main reel, they reach a position where they extend beyond the periphery of the main reel and lift the thread from the thread-supporting arms between which they extend. As each of the thread-engaging arms 23 reaches a position where it lifts the thread from the thread-supporting arms of the main reel, the inner reel 22 is moved forward relative to the main reel a distance approximately equal to or slightly greater than the diameter of thread. All of the thread on the reel will be lifted and advanced thereby. As the rotation of reels continues, the thread-engaging arm 23 of the inner reel 22 deposits the thread in the advanced position on the adjacent thread-supporting arm 11. Prior to the following thread-engaging arm reaching its thread-lifting position, the inner reel is returned to its initial position.

The reciprocation of the inner reel in this manner is accomplished by a cam 30 that is secured to the slidably mounted shaft 24 supporting the inner reel. The cam 30 engages with a fixed cam guide 31 secured to the frame 17. The cam 30 is designed to cause such reciprocation each time one of the thread-engaging arms 23 interdigitates with the main reel. In the reel illustrated, the inner reel has three thread-engaging arms and is therefor reciprocated three times during each revolution. The layout of the cam 30 is shown in somewhat exaggerated form in Fig. 5.

To start a reel of the type described herein in operation, several loops of the thread are wrapped around the reel and thereafter the continued winding and advancing of the thread will be entirely automatic. Any parts of the reel that may come into contact with corrosive liquors or similar agents used in the treatment of the thread may be made of materials that will not be injured thereby, such as stainless steel or the like. The interior of the reel is largely free from obstruction and spray pipes or other apparatus may be readily placed inside of the reel if desired.

It will be understood that various changes and modifications of the reel illustrated and described herein may be made by those skilled in the art without departing from the scope of the invention as defined in the claims appended hereto.

I claim:

1. In a reel for automatically winding and advancing thread in a helical path thereon, a thread-supporting reel having an annular opening at one end thereof and a series of thread-supporting arms spaced about the periphery thereof, a shaft supporting said reel, a second shaft spaced from said first-mentioned shaft, said second shaft extending through the annular opening in the end of the thread-supporting reel, a single inner reel of smaller diameter than said thread-supporting reel supported on said second shaft within the thread-supporting reel, said inner reel being axially reciprocable relative to the thread-supporting reel and having a series of thread-engaging arms spaced about the periphery thereof, said thread-engaging arms interdigitating successively between adjacent arms of the thread-supporting reel and successively projecting beyond the outer surface of thread-supporting arms as said reels are rotated.

2. In a reel for automatically winding and advancing thread in a helical path thereon, a thread-supporting reel having an annular opening at one end thereof and a series of thread-supporting arms spaced about the periphery thereof, a shaft supporting said reel, a second shaft spaced from said first-mentioned shaft, said second shaft extending through the annular opening in the end of the thread-supporting reel, a single inner reel of smaller diameter than said thread-supporting reel supported on said second shaft parallel to said first shaft within the thread-supporting reel, said inner reel being axially reciprocable relative to the thread-supporting reel and having a series of thread-engaging arms spaced about the periphery thereof, said thread-engaging arms interdigitating successively between adjacent arms of the thread-supporting reel and successively projecting beyond the outer surface of thread-supporting arms as said reels are rotated.

3. A reel for automatically winding and advancing thread in a helical path thereon comprising a main thread-supporting reel having a series of thread-supporting arms spaced about the periphery thereof, an axially reciprocable inner reel, said inner reel being rotatably mounted on an axis spaced from but parallel to the axis of the main reel and within the periphery of said main reel, said inner reel having a series of thread-engaging arms carried thereby, said thread-engaging arms successively interdigitating between and extending beyond the outer surfaces of the thread-supporting arms of the main reel as said reels are rotated whereby the thread-engaging arms of said inner reel lift turns of thread from the thread-supporting arms of the main reel adjacent thereto and advance said turns of thread on said main reel as the inner reel is reciprocated.

4. A reel for automatically winding and advancing thread in a helical path thereon comprising a rotatable thread-supporting reel having a series of thread-supporting arms spaced about the periphery thereof, an axially reciprocable reel rotatably mounted on an axis located within said thread-supporting reel, said axis being spaced from but parallel to the axis of rotation for the thread-supporting reel, said reciprocable reel having a series of thread-engaging arms interdigitating successively between said thread-supporting arms of the thread-supporting reel and successively extending beyond the outer surface of said thread-supporting arms as said reels are rotated thereby lifting turns of thread carried by said thread-supporting reel from the thread-supporting arms adjacent the interdigitated thread-engaging arm and means for moving said reciprocable reel forward relative to the thread-supporting reel when the thread-engaging arms thereof have so engaged the thread and thereafter returning the reciprocable reel to its initial position.

5. In a reel for automatically winding and advancing thread in a helical path thereon, a main thread-supporting reel having a series of thread-supporting arms spaced about the periphery thereof and a single reel of a smaller diameter than said thread-supporting reel with its axis of rotation located within the periphery of said main thread-supporting reel, said second reel being axially reciprocable relative to the main thread-supporting reel and having a series of thread-engaging arms spaced about its periphery, said thread-engaging arms on the second reel interdigitating successively between the thread-supporting arms of the main thread-supporting reel with the interdigitating, thread-engaging arms successively projecting beyond the outer surface of the thread-supporting arms adjacent thereto as the reels are rotated.

6. In a reel for automatically advancing a thread wound around said reel in a spiral path, the combination which includes a rotatable thread-supporting reel, said reel being hollow and having a series of spaced thread-supporting arms defining the thread-bearing periphery of said reel, a shaft supporting said reel, said reel having an opening at one end thereof surrounding said shaft and communicating with the interior of the reel, a second shaft spaced from the first shaft and extending through the opening in the end of the thread-supporting reel and a rotatable reel supported on said second shaft inside of and reciprocable lengthwise with respect to said main thread-supporting reel, said second reel being of a smaller diameter than the thread-supporting reel and having a series of thread-engaging arms spaced about the periphery thereof, said thread-engaging arms on the second reel interdigitating successively between the spaced thread-supporting arms of the thread-supporting reel with the interdigitated arms successively extending beyond the thread-bearing periphery of the main thread-supporting reel as the reels are rotated.

STANLEY C. KERSHAW.

REFERENCES CITED

The following references are of record in the file of this patent:

| Number | Name | Date |
| --- | --- | --- |
| 2,384,963 | Pollak | Sept. 18, 1945 |
| 2,424,489 | Moritz | July 22, 1947 |
| 2,425,136 | Torrence | Aug. 5, 1947 |